(12) United States Patent
Ferreira et al.

(10) Patent No.: US 12,527,733 B2
(45) Date of Patent: Jan. 20, 2026

(54) FRAGRANCE COMPOSITIONS

(71) Applicant: ELC MANAGEMENT LLC, Melville, NY (US)

(72) Inventors: Jaime Manuel Ferreira, Park Ridge, NJ (US); Geng Li, Brooklyn, NY (US); Alicia Marie Blake, Brooklyn, NY (US)

(73) Assignee: ELC MANAGEMENT LLC, Melville, NY (US)

(*) Notice: Subject to any disclaimer, the term of this patent is extended or adjusted under 35 U.S.C. 154(b) by 724 days.

(21) Appl. No.: 17/883,532

(22) Filed: Aug. 8, 2022

(65) Prior Publication Data

US 2023/0048533 A1 Feb. 16, 2023

Related U.S. Application Data

(60) Provisional application No. 63/230,786, filed on Aug. 8, 2021.

(51) Int. Cl.
| | | |
|---|---|---|
| *A61K 8/92* | (2006.01) | |
| *A61K 8/37* | (2006.01) | |
| *A61Q 13/00* | (2006.01) | |

(52) U.S. Cl.
CPC .............. *A61K 8/92* (2013.01); *A61K 8/37* (2013.01); *A61Q 13/00* (2013.01); *A61K 2800/49* (2013.01)

(58) Field of Classification Search
CPC . A61Q 13/00; A61K 8/39; A61K 8/37; A61K 8/86; A61K 8/92; A61K 2800/262; A61K 2800/30; A61K 2800/49
USPC .......................................................... 512/2, 1
See application file for complete search history.

(56) References Cited

U.S. PATENT DOCUMENTS

| | | |
|---|---|---|
| 5,252,555 A | 10/1993 | Dartnell et al. |
| 8,343,521 B2 | 1/2013 | Shick et al. |
| 10,980,717 B2 | 4/2021 | Lee et al. |
| 2013/0101531 A1 | 4/2013 | Shick et al. |
| 2017/0298290 A1 | 10/2017 | Diez et al. |

FOREIGN PATENT DOCUMENTS

| | | |
|---|---|---|
| EP | 0571677 A1 * | 5/1992 |
| EP | 0631771 A1 | 1/1995 |
| EP | 0726755 | 8/1996 |
| EP | 1556009 | 7/2005 |
| EP | 2127632 | 12/2009 |
| EP | 3552599 A1 | 10/2019 |
| WO | WO-2017/180453 A1 | 10/2017 |
| WO | WO-2018/21970 A1 | 1/2018 |
| WO | WO-2018219770 A1 | 12/2018 |
| WO | WO-2020/129036 A2 | 6/2020 |
| WO | WO-2023/018673 A1 | 2/2023 |

OTHER PUBLICATIONS

Supplementary European Search Report; EP Application No. 22856481.1; Completion Date: Dec. 4, 2024.

PCT International Search Report; International Application No. PCT/US2022/039756; Completion Date: Nov. 23, 2022; Mailing Date: Nov. 23, 2022.

PCT Written Opinion of the International Searching Authority; International Application No. PCT/US2022/039756; Completion Date: Nov. 23, 2022.

* cited by examiner

*Primary Examiner* — Jessica Whiteley

(74) *Attorney, Agent, or Firm* — Halle D. Murray

(57) ABSTRACT

A fragrance composition is provided. The fragrance composition comprises one or more fragrance ingredients, at least one solubilizer, and acceptable carriers, and the composition is substantially free of ethanol. The composition is a perfume, perfume water, eau de toilette, eau de cologne, eau de parfum, fragrance mist, or air freshener. The composition may be personalized and may also provide a sensory experience.

17 Claims, No Drawings

FRAGRANCE COMPOSITIONS

FIELD

The present disclosure relates generally to fragrance compositions. More particularly, the disclosure relates to water-based fragrance compositions.

BACKGROUND

Perfumes have been used for thousands of years. The industrial production of essential oils and the synthesis of odorous substances have improved the availability and the range of application of perfumes. Perfumery focuses on the creation of new fragrances, which are generally composed of more than 100 individual components, and fixing the base note to increase clinging and adhesion of the perfume to the user's skin. Other focuses of perfumery are the skin feel that the perfume creates when applied on the skin, and the transparency index of the fragrance solution.

Typically, the fragrance ingredients are not soluble in water, thus a traditional perfume uses ethanol, other organic solvents, or carrier oils to dissolve fragrance ingredients. Ethanol is the most used component in perfumery, due to its many advantages such as evaporating rapidly in the atmosphere, cooling the skin, and giving a very desirable cooling sensation on the human skin. On the other hand, due to ethanol's Volatile Organic Compounds (VOC) nature and its negative effects on skin integrity, the perfume industry has been consistently working to partially or fully replace ethanol in perfumes as regulations regarding VOC have become more stringent. More importantly, informed consumers have demanded perfume products with less ethanol.

The perfume industry has made some successes by replacing ethanol in perfumes with other organic solvents. However, ethanol's advantages cannot be easily realized by other organic solvents. One major disadvantage of other organic solvents is that they create an oily feel on the skin that compromises the fragrance bloom due to their lower vapor pressure. Another disadvantage is that other organic solvents may create stains on the applied surfaces. As described above, there is a need for improved fragrance compositions that are substantially free of ethanol.

SUMMARY

A water-based fragrance composition is provided. The fragrance composition comprises at least one fragrance ingredient, at least one solubilizer, and acceptable carriers, and is substantially free of ethanol. The at least one solubilizer is selected from the group consisting of PPG-26-buteth-26, PEG-40 hydrogenated castor oil, trideceth-9, PPG-20 methyl glucose ether, dipropylene glycol, hydrophilic polymers, and mixtures thereof, and the at least one fragrance ingredient is selected from the group consisting of fragrance oils, esters, terpenes, aldehydes, ethers, lactones, amines and mixtures thereof. The at least one fragrance oil is present from about 0.01% to about 25% by weight, relative to the total weight of the composition. The at least one solubilizer is present from about 0.01% to about 75% by weight, relative to the total weight of the composition and the ratio of the solubilizer and the fragrance ingredients is from about 10:1 to about 1:10. The fragrance composition further comprises one or more preservatives or boosters.

The fragrance composition has a viscosity of less than about 100 cps. The fragrance composition is stable at room temperature for at least eight weeks.

The fragrance ingredient has a c Log P value less than about 5.

The fragrance composition is in a form selected from the group consisting of perfume, perfume water, eau de toilette, eau de cologne, eau de parfum, fragrance mist, and air freshener. The composition may be a spray or a continuous spray. The composition may be paired with one or more fragrance accords to obtain a personalized fragrance composition for individual user's needs. The composition may further comprise particles that impart a sensory experience.

DETAILED DESCRIPTION

The dimensions and values disclosed herein are not to be understood as being strictly limited to the exact numerical values recited. Instead, unless otherwise specified, each such dimension is intended to mean both the recited value and a functionally equivalent range surrounding that value. Except in operating and comparative examples, or where otherwise explicitly indicated, all numbers in this description indicating amounts or ratios of material or conditions of reaction, physical properties of materials and/or use are to be understood as modified by the word "about". All amounts are by weight of the final composition unless otherwise specified.

As used herein, the term "water-based fragrance composition" refers to a fragrance composition comprising more than about 40% of water, relative to the total weight of the composition.

As used herein, the term "perfume composition" or "fragrance composition" refers to a product of usual perfumes but also to other fragrances such as cologne, eau de toilette, aftershave, aftershave, facial tonics, tonics, etc.

The term "perfume oils" refers to substances known to modify the smell of a product or provide a smell to a person, including but not limited to essential oils, synthetic fragrances, or mixtures thereof. The essential oils may be odor substances obtained by physical processes, preferably distillations, from plants or spices.

As used herein, the terms "spray" or "spray system" refers to compositions having a flowable consistency capable of being discharged or dispensed from an aerosol, an atomizer, or the like.

As used herein, the term "Log P" value of a compound refers to the logarithm of its partition coefficient (P), and is defined as a particular ratio of the concentrations of a solute between the two solvents (in a bi-phase of liquid phases), for un-ionized solutes, between n-octanol and water (c Log (octanol/water), which is calculated as Log P (Partition Co-efficient)=Log ([organic]/[aqueous]), indicating the concentration of solute in the organic and aqueous partition. c Log P is a calculated Log P value. The higher the c Log P value of a compound is, the more hydrophobic the compound is.

As used herein, the term "substantially free of ethanol" refers to the compositions having less than about 0.0010% of ethyl alcohol, relative to the total weight of the composition. According to the FDA, cosmetic products that do not contain ethyl alcohol (also known as ethanol, or grain alcohol) may be referred to and labeled as "alcohol-free." Also, in perfume industry, the term "alcohol" generally refers to ethyl alcohol, thus the term "substantially free of alcohol" in perfume industry refers to compositions having less than about 0.0010% of ethyl alcohol, relative to the total weight of the composition. However, since alcohols could also mean a large and diverse family of chemicals with different names and a variety of effects on the human skin in the general chemical society, the term "substantially free of ethanol" is used in the present disclosure instead of "substantially free of alcohol" in order to avoid possible misunderstandings.

As used herein, the term "room temperature" refers to from about 20 to about 40 degree Celsius.

The fragrance composition disclosed herein may comprise at least one fragrance ingredient, at least one solubilizer, and water.

The fragrance composition may be substantially free of ethanol. Preferably, the fragrance compositions may have less than about 0.0010% of ethyl alcohol, relative to the total weight of the fragrance composition.

In traditional fragrance development, the high amount of water present in the composition may reduce the transparency of the fragrance composition, resulting in a cloudy or milky appearance. It is well understood in the perfume industry that the higher the water amount is, the harder it is to achieve a stable fragrance composition. The fragrance composition disclosed herein may comprise more than about 40% of water relative to the total weight of the composition. In some compositions, the amount of water may be more than about 50%, and in others, it may be more than about 60%, 70%, 75%, or 80%, by weight, relative to the total weight of the fragrance composition. In some extraordinary cases, the fragrance composition comprises more than 85% by weight, relative to the total weight of the fragrance composition. Advantageously, the fragrance composition is translucent or transparent.

The fragrance compositions is stable and storable over a wide range of temperatures and conditions. The fragrance compositions provide full olfactory restitution of fragrance oil connected to long-term olfactory stability. The fragrance compositions may stay stable and clear without any precipitation or cloudiness for at least eight weeks when stored at 40° C.

The fragrance composition contains a high amount of water, and is substantially free of ethanol and in the form of translucent or transparent compositions over a wide range of temperatures and conditions. The fragrance composition provides an unexpected smooth, silky, and non-sticky skin-feel with an improved sensation, upon application on the skin.

The fragrance ingredient may comprise at least one fragrance oil. The fragrance oil may comprise essential oil, synthetic fragrance, or mixtures thereof. The fragrance oil may be present in an amount ranging from about 0.01% to about 40%, preferably from about 0.10% to about 25%, more preferably from about 1% to about 10%, relative to the total weight of the fragrance composition.

The fragrance oil may have a c Log P value of less than about 5, preferably less than about 3.1, more preferably less than about 2.0. It is well understood in the perfume industry that a fragrance oil having c Log P value higher than 5 is very hydrophobic and would require additional solubilizers to help appropriate mixing into the composition.

The fragrance ingredient may include fragrance oil, esters, terpenes, aldehydes, ethers, lactones, amines, and mixtures thereof. The fragrance oils such as, without limitation, musk oil, civet, castoreum, ambergris, plant perfumes, sandalwood oil, neroli oil, bergamot oil, lemon oil, lavender oil, sage oil, rosemary oil, peppermint oil, eucalyptus oil, menthol, camphor, verbena oil, citronella oil, coconut oil, salvia oil, clove oil, chamomile oil, costus oil, labdanum oil, broom extract, carrot seed extract, jasmine extract, mimosa extract, narcissus extract, olibanum extract, rose extract, acetophenone and derivatives thereof, dimethylaniline derivatives, naphthalene derivatives, allyl caprate, alpha-amyl cinnamic aldehyde, anethole, anisaldehyde, benzyl acetate, benzyl alcohol, benzyl propionate, borneol, cinnamyl acetate, cinnamyl alcohol, citral, citronellal, cumin aldehyde, cyclamen aldehyde, decanol, ethyl butyrate, ethyl caprate, ethyl cinnamate, ethyl vanillin, eugenol, geraniol, exenol, alpha-hexyl cinnamic aldehyde, hydroxy citronellal, indole, iso-amyl acetate, iso amyl isovalerate, iso-eugenol, linalol, linalyl acetate, p-methyl acetophenone, methyl anthranilate, methyl dihydrojasmonate, methyl eugenol, methyl-beta-naphthol ketone, methyl phenyl carbinyl acetate, musk ketol, musk xylol, 2,5,6-nonadienal, gamma-nonalactone, phenyl acetaldehyde dimethyl acetal, beta-phenyl ethyl alcohol, 3,3,5-trimethylcyclohexanol, gamma-undecalactone, undecenal, vanillin, metofluthrin, limonene, terpinene gamma, calone, helional, or mixtures thereof may be utilized.

Scent additives or fragrance oils may also comprise musk oil, civet, castoreum, ambergris, plant perfumes, sandalwood oil, neroli oil, bergamot oil, lemon oil, lavender oil, sage oil, rosemary oil, peppermint oil, eucalyptus oil, menthol, camphor, verbena oil, citronella oil, coconut oil, salvia oil, clove oil, chamomile oil, costus oil, labdanum oil, broom extract, carrot seed extract, jasmine extract, mimosa extract, narcissus extract, olibanum extract, rose extract, acetophenone and derivatives thereof, dimethylaniline derivatives, naphthalene derivatives, allyl caprate, alpha-amyl cinnamic aldehyde, anethole, anisaldehyde, benzyl acetate, benzyl alcohol, benzyl propionate, borneol, cinnamyl acetate, cinnamyl alcohol, citral, citronellal, cumin aldehyde, cyclamen aldehyde, decanol, ethyl butyrate, ethyl caprate, ethyl cinnamate, ethyl vanillin, eugenol, geraniol, exenol, alpha-hexyl cinnamic aldehyde, hydroxy citrolnellal, indole, iso-amyl acetate, iso amyl isovalerate, iso-eugenol, linalol, linalyl acetate, p-methyl acetophenone, methyl anthranilate, methyl dihydro jasmonate, methyl eugenol, methyl-beta-naphthol ketone, methyl phenyl carbinyl acetate, musk ketol, musk xylol, 2,5,6-nonadienal, gamma-nonalactone, phenyl acetaldehyde dimethyl acetal, beta-phenyl ethyl alcohol, 3,3,5-trimethylcyclohexanol, gamma-undecalactone, undecenal, vanillin, metofluthrin, or mixtures thereof, bergamot oil, jasmine extract, lavender oil, limonene, terpinene gamma, calone, helional, or mixtures thereof, limonene, terpinene gamma, calone, helional, or mixtures thereof. The scent additives may also comprise bergamot oil, jasmine extract, lavender oil, bergamot oil, jasmine extract, lavender oil, or mixtures thereof.

The fragrance composition may have a viscosity of less than about 100 cps, preferably less than about 50 cps, and more preferably less than 15 cps.

The measure of viscosity indicates the transparency of the composition.

The ratio of the total amount of solubilizers to the total amount of the fragrance oils present may be from about 10:1 to about 1:10, including all ranges and sub-ranges within. At such ratios, the compositions exhibit stability and transparency at temperatures ranging from about 3° C. to about 55° C. and in ambient conditions.

The total amount of solubilizers may be from about 0.001% to about 75%, preferably from about 0.01% to about 50%, more preferably from about 0.10% to about 20%, most preferably from about 1% to about 10%, particularly preferably from about 2% to about 5%, by weight, relative to the total weight of the composition.

The fragrance composition may comprise more than one solubilizer.

The solubilizer may be selected form the group consisting of PPG-26-buteth-26, PEG-40 hydrogenated castor oil, trideceth-9, glycereth-26, heptyl glucoside, capryl/capryl glucoside, PPG-5-laureth-5, polysorbate 20, PEG-40 castor oil, PPG-1-PEG-9 lauryl glycol ether, coceth-7, PPG-1-PEG-9 lauryl glycol ether, PEG-80 castor oil, PEG-25 hydrogenated castor oil, PEG-4, PEG-20, and mixtures thereof. Preferably, the solubilizer may be selected from the group consisting of PPG-26-buteth-26, PEG-40 hydrogenated castor oil, trideceth-9, and mixtures thereof.

Most preferably, the solubilizers comprise PPG-26-buteth-26, PEG-40 hydrogenated castor oil, and trideceth-9. The ratio of the amount of PPG-26-buteth-26 to the amount of PEG-40 hydrogenated castor oil may range from about 10:1 to about 1:30, preferably from about 5:1 to about 1:20, more preferably from about 2:1 to about 1:10, most preferably from about 1:1 to about 1:5. The ratio of the amount of PPG-26-buteth-26 to the amount of trideceth-9 may range from about 30:1 to about 1:20, preferably from about 20:1 to about 1:15, more preferably from about 10:1 to about 1:10, most preferably about 5:1 to about 1:5.

The fragrance composition may be formulated as a perfume, perfume water, eau de toilette, eau de cologne, eau de parfum, fragrance mist, or air freshener. In some compositions, the fragrance blend may be formulated as a body lotion, body creme, deodorant spray, deodorant stick, shower gel, body scrub, shampoo, bubble bath, or soap.

The fragrance compositions may further comprise fragrance modulators and cosmetically compatible silicone oils.

The fragrance modulators may be chosen from 3-((2-ethylhexyl)oxy)-propane-1,2-diol, dibenzylidene Sorbitol, dislearyl Ether; Ethylene glycol monomethyl ether, Tri-o-(cis-3-hexenyl)-glactopyranose, (E)-1-(2,2,6-trimethylcyclohexyl)oct-1-en-3-one; 1-amino-3-((2-ethylhexyl)oxy)-propan-2-ol, 1-(1-Methyl-2-propoxyelhoxy)-2-propanol; 1-(1-menthoxy)propane-2-ol, 1, 1,2,4,4-pentamethyl-6-acetyl-7-formyl-1,2, 3, 4-tetrahydronaphthalene, 1,1,4,4-tetramethyl-6-acetyl-7-formyl-1,2,3,4-tetrahydronaphthalene, 2-(2-butoxyethoxy)ethanol, 2-(2-Butoxyethoxy)ethyl (6-propylpiperonyl) ether, 2-(hexadecyloxy)ethanol, 2-(l-menthoxy)ethane-1-ol, 2,4,6-tris[bis(methoxymethyl)amino]-1,3,5-triazine formaldehyde)methylated; 2-diphenylmethoxy-N,N-dimethylethylamine hydrochloride, 2-methyl-3-(l-menthoxy)propane-1,2-diol, 3-((2-propylheptyl)oxy)-propane-1,2-diol;3-(l-menthoxy)propane-1,2-diol, 3-(l-menthoxy)propane-1-ol;3-methoxybutanol;4-(l-menthoxy), 02-14, ethoxylated; allantoin ascorbate, beheneth-5; benzylhemiformal, bis-methoxy PEG-13, bis-0-(3,6-dioxadecanyl)-glucopyranose, bis-O-(3,6-dioxadodecanyl)-glucopyranose, bis-0-(3,6-dioxaheptanyl)-xylopyranose, bis-O-(3,6-dioxaoctanyl)-galactopyranose, butoxy ethanol, C10-16 pareth-l, C12-14 Sec-Pareth-3, Cl 4-15 Pareth-7, caprylyl glyceryl ether, cetearyl ethylhexnoate, ceteth-lO, ceteth-l2, ceteth-2, ceteth-3, ceteth-4, ceteth-5, cetoleth-lO, cetoleth-lO, coceth-lO or Polyoxyethylene (10) dodecyl ether, decaethylene glycol mono-dodecyl ether lauryl ether, deceth-4, deceth-4 phosphate, deceth-6, dermofeelG, dicetyl ether, dielhylene glycol, diethoxynonadiene, di-ethylene glycol ethyl ether, diglycerin, dihydro-7a-ethyloxazolo [3,4-c]oxazole dioxabicyclo[3.3.0]octane, diisoamyl adipate, diisobutyl adipate, dimethoxydiglycol ethers, dimethyl oxazolidine, di-0-(cis-3-hexenyl)-glactopyranose, di-0-(linalyl)-glucopyranose, dioxolane, dipentaerythrityl, hexacaprylate/hexacaprate, dipropylene glycol dimethyl ether, dipropylene glycol monomethyl ether, disodium lauroamphodipropionate, distearyl ether, DL-panthenol, ethoxyethanol alcohols, diethyl ether, ethyl hydroxymethyl oleyl oxazoline; ethylhexylglycerin, glycerol ethoxylate; glycerol formal, glycerol propoxylate, hexaethylene glycol monododecyl ether, hexaethylene glycol monohexadecyl ether, hexaethylene monododecyl ether, hyaluronic acid disaccharide sodium salt, hydroquinone beta-D-glycoside, hydroxymethyl dioxoazabicyclooctane, isoceteth-lO, isoceteth-l2, isoceteth-l5, isoceteth-20, isoceteth-25, isoceteth-30, isoceteth-5, isoceteth-7, isosteareth-5, laureth-l, laureth-lO, laureth-2, laureth-3, laureth-4, laureth-5, laureth-7, laureth-8, menthone glycerin acetal, menthoxypropanediol, methoxydiglycol ethers, methyl hexyl ether ethers, methyl hydroxymethyl oleyl oxazoline, methyl morpholine oxide amine oxides, methylal ethers, mono-0-(cis-3-hexenyl)-glactopyranose, mono-O-(linalyl)-glucopyranose; morpholine, myreth-3, myreth-4, myreth-5, octyl ether dioctyl ether, octylphenoxy poly(ethyleneoxy)ethanol, branched oleth-lO, oleth-2, oleth-3, oleth-4, oleth-5, oleth-8, panthenol ethyl ether, PEG-10, PEG-12, PEG-15 oleamine, PEG-3 methyl ether, PEG-5 hydrogenated tallow amine, PEG-6, PEG-9, pentakis-0-(3,6-dioxadecanyl)-glucopyranose, pentakis-0-(3,6-dioxadodecanyl)-glucopyranose, pentakis-0-(3,6-dioxaoctanyl)-galactopyranose, penta-0-(cis-3-hexenyl)-glactopyranose, penta-0-(linalyl)-glucopyranose, pluronic F-127, poloxamine 1307, poly(ethylene glycol) methyl ether, poly(ethylene glycol-ran-propylene glycol) monobutyl ether, poly(oxy-1,2-ethanediyl), a-decyl-w-hydroxy-ethoxylate, polypropylene glycol) monobutyl ether, polyethylene glycol 1100 mono(hexadecyl/octadecyl), polyethylene glycol hexadecyl ether, polyglycerin #310, polyglycerin-4 ethers, polyglyceryl-10 dioleate; polyglyceryl-10 myristale, polyglyceryl-10 Oleate, polyglyceryl-10 stearate, polyglyceryl-10 tetraoleale, polyglyceryl-10 trioleate, polyglyceryl-2 oleyl ether, polyglyceryl-6 isostearate, polyglyceryl-6 laurate, polyimide-l, polym ethoxy bicyclic oxazolidine, polyoxy(ethylene glycol), polyoxyethylene (20) oleyl ether; polyquatemium-lO, polyvinyl stearyl ether, PPG-10 cetyl ether, PPG-1 1 stearyl ether, PPG-1 1 stearyl ether Kj, PPG-2 methyl ether, PPG-23-steareth-34, PPG-4-ceteth-lO, PPG-5-ceteth-20, pramoxine HCl, propyl (4-[2-(diethylamino)-2-oxoethoxy]-3-methoxyphenyl) acetate, propylene glycol, propylene glycol caprylate, propylene glycol n-butyl ether, propylene glycol propyl ether, sodium hyaluronate, sodium octoxynol-2 ethane sulfonate, stearamidopropyl morpholine, stearamidopropyl morpholine lactate, steareth-lO, steareth-lO allyl ether, steareth-lO allyl ether/acrylates copolymer, steareth-2, steareth-3, steareth-4, steareth-5, steareth-6, steareth-7, stearoxypropyl dimethylamine, sucrose dilaurate, sucrose distearate, sucrose laurate, sucrose myristate, sucrose palmitate, sucrose stearate, sucrose tristearate, talloweth-7, TEA-lauryl ether, tetra(ethylene glycol), tetrakis-0-(3,6-dioxadodecanyl)-glucopyranose, tetrakis-0-(3,6-dioxaheptanyl)-xylopyranose, tetrakis-0-(3,6-dioxaoctanyl)-galactopyranose, tetra-0-(cis-3-hexenyl)-glactopyranose, tetra-0-(linalyl)-glucopyranose, tri (propylene glycol) n-butyl ether, trideceth-3, tridecyl ether, triethylene glycol, triglycerol diisostearate, trimethyl pentanol hydroxyethyl ether, tri-0-(linalyl)-glucopyranose, tripropylene glycol, tris-0-(3,6-dioxadecanyl)-glucopyranose, tris-0-(3,6-dioxadodecanyl)-glucopyranose, tris-0-(3,6-dioxaheptanyl)-xylopyranose, tris-0-(3,6-dioxaoctanyl)-galactopyranose, PPG-20, methyl glucose Ether, dipropylene glycol, hydrophilic polymers or mixtures thereof.

Exemplary silicone oils include, without limiting, Bis-PEG-12 Dimethicone, PEG-8 Dimethicone, PEG-12 Dimethicone, PEG-8 Dimethicone, PEG-33 (and) PEG-8 Dimethicone, PEG-14, PEG/PPG-18/18 Dimethicone, PEG-9 Dimethicone, PEG-12 Dimethicone, PEG-9 Polydimethylsiloxyethyl Dimethicone, PEG-10 Dimethicone, PEG-3

Dimethicone, PEG-17 Dimethicone, Bis-PEG-8 Dimethicone, Bis-PEG-10 Dimethicone, Bis-PEG-8 PEG-8 Dimethicone, Dimethicone PEG-8 Succinate, PEG/PPG-20/15 Dimethicone (and) PPG-20 (and) Dimethicone, Bis-PEG/PPG-16/16 PEG/PPG-16/16 Dimethicone, PEG/PPG-19/19 Dimethicone, PEG/PPG-14/4 Dimethicone, PEG/PPG-22/23 Dimethicone, Cetyl PEG/PPG-10/1 Dimethicone, Bis-PEG/PPG-20/20 Dimethicone, PEG/PPG-20/20 and Phenylisopropyl Caprylyl Dimethicone.

The fragrance composition may comprise hydroxy acetophenone, potassium sorbate, and caprylyl glycol in a ratio range from about 0.01:0.01:0.01 to about 1:1:1.

In compositions, additives may be included in the composition and may comprise particles that impart a tactile sensory experience to a user. Such particles impart a soft sensory experience, a cool or warm sensory experience, or a conditioner to the skin of a user. Additives may further provide a visual effect, such as a sparkle from light-reflecting, glittering particles. The light-reflecting glittering particles may be selected from one or more of titanium oxide, mica, other iron oxides such as yellow, red and brown, black, tin oxide, or mixtures thereof.

In some compositions, the visual effect may be attributed by including particles and/or dyes in the composition. Such particles may comprise one or more of ferric ammonium ferrocyanide (blue), manganese violet, ultramarine blue, chrome oxide (green), 30 talc, lecithin modified talc, zeolite, kaolin, lecithin modified kaolin, titanium dioxide (white), and mixtures thereof. In compositions, the visual effect comprises one or more pearlescent such as, for example, mica, bismuth oxychloride and treated micas, such as titanated micas and lecithin modified micas that include mica, coated with varying thickness of titanium dioxide and particles that include thin-film optics imparting brilliant luster and a broad range of interference colors and multicolor effect. The visual effect may further comprise one or more particles that include tiny light-emitting diodes, LEDs, or luminescent materials that impart to the fragrance a capacity for emitting light, either continuously or intermittently. The fragrance compositions can be used, for example, in the form of perfumes and products, including, sunscreen gels, products after sun exposure, lotions, body gels, lotions after shaving and before shaving, colonies, moisturizing eau de toilette, styling waters, and/or facial tonics. The production of such products is carried out in a manner known to one skilled in the art.

The following examples describe the compositions and the methods of the fragrance compositions described herein. The exemplary preservative system and preservative booster system include, without limiting, gluconolactone/sodium benzoate/calcium gluconate, phenoxyethanol/chloroxylenol, benzyl alcohol/benzoic acid/sorbic acid, benzyl alcohol/pentylene glycol/benzoic acid/sorbic acid, phenoxyethanol/decylene glycol/phenoxyethanol/caprylyl glycol/potassium sorbate/water/hexyleneglycol;1,2-hexanediol, propanediol/phenylpropanol/caprylylglycol;phenoxyethanol/caprylyl glycol/sorbic acid; phenoxyethanol/chlorphenesin/glycerin/sorbic acid; caprylyl glycol/phenoxyethanol/hexylene glycol; hydroxyacetophenone; phenoxyethanol/benzyl alcohol/potassium sorbate/tocopherol or combinations thereof.

Use

Various methods of treatment, application, regulation, or improvement may utilize the aforementioned compositions. Application of the present compositions can occur on any skin surface of the body. Skin surfaces of the most concern tend to be those covered by clothing such as facial skin surfaces, hand, and arm skin surfaces, foot and leg skin surfaces, and neck and chest skin surfaces (e.g., decolletage). The composition may be applied at least once a day, twice a day, or on a more frequent daily basis, during a treatment period. When applied twice daily, the first and second applications are separated by at least 1 to about 12 hours.

The composition may be applied along with other products or formulations. The form of the composition or the acceptable carrier should be selected to facilitate localized application. While certain embodiments of the present invention contemplate applying locally, it will be appreciated that compositions of the present invention can be applied more generally or broadly to one or more skin surfaces. Likewise, the compositions can be applied as a continuous spray, lotion, or a spray. The formulation may be paired with multiple fragrance notes and may also be personalized and/or layered benefitting individual customer needs. Such pairing may be achieved by adding additional fragrance notes or fragrance accords to satisfy the individual's needs, resulting in a personalized fragrance composition that is unique to the consumer.

Non-limiting examples of the fragrance compositions include, but are not limited to, perfumes, home fragrances, sunscreens and blocks, mousse, bath and shower gels, lip balms, skin conditioners, cold creams, moisturizers, soaps, body scrubs, body wash, face wash, body spray, exfoliants, astringents, scuffing lotion, depilatories shaving, pre-shaving, and after-shaving products, deodorants and antiperspirants, cleansers, skin gels, and rinses, skin lightening, and self-tanning compositions. Non-limiting examples of hair care compositions include, but are not limited to, shampoo, conditioner, treatment, styling, hair spray, permanent styling, tonics, cream rinse, hair dye, hair coloring, hair bleaching, hair shine, hair serum, anti-frizz, volumizers, split-end repair, anti-dandruff formulations, and mascara. Non-limiting examples of other cosmetic compositions include but are not limited to makeup, including lipstick, rouge, foundation, blush, eyeliner, lip liner, lip gloss, facial or body powder, nail polish, eye shadow, among others.

Furthermore, the composition can be applied topically through the use of a patch or other delivery device. In some embodiments, for example, the composition described herein is in the form of a skin lotion, clear lotion, milky lotion, cream, gel, foam, ointment, paste, emulsion, spray, conditioner, tonic, cosmetic, lipstick, foundation, nail polish, after-shave, or the like, which is intended to be left on the skin or other keratinous tissue for some aesthetic, prophylactic, therapeutic or other benefits (i.e., a "leave-on" composition or skincare composition). After applying the composition to the keratinous tissue (e.g., skin), it is preferably left on for a period of at least about 2 minutes, 5 minutes, 15 minutes, more preferably at least about 30 minutes, even more preferably at least about 1 hour, even more preferably for at least several hours, e.g., up to about 12 hours. Any part of the external portion of the human body, that is not sensitive may be applied with the fragrance compositions. The application of the present compositions may be done using the palms of the hands and/or fingers or a device or implement (e.g., a cotton ball, swab, pad, applicator pen, spray applicator, etc.).

EXAMPLES

Example 1: Fragrance Compositions

The example compositions (Formula 1-7) were prepared as described below.
1. Phase D was heated at a temperature greater than 45 degrees C. until it was melted.
2. Phase B was premixed and added to Phase D, and cooled down to the room temperature, resulting Phase BD.

3. Phase BD was then combined with the premixed Phase C, resulting in Phase BDC.
4. Phase BDC was slowly added to a premixed Phase A while mixing at 500 rpm until the solution turns from cloudy to clear.

The process described herein may be modified to adjust the mixture speed and mixing rate to reduce the particle size of the emulsion. The Fragrance Oil was measured to have a c Log P value of 2.57, with no significant level of acids and bases present. The example compositions provided herein are embodiments the stable clear fragrance compositions substantially free of ethanol.

TABLE 1

Fragrance Compositions

| CTFA name | 1 (wt. %) | 2 (wt. %) | 3 (wt. %) | 4 (wt. %) | 5 (wt. %) | 6 (wt. %) | 7 (wt. %) |
|---|---|---|---|---|---|---|---|
| Phase A | | | | | | | |
| Water | 86.35 | 80.04 | 56.89 | 86.24 | 76.4 | 37.53 | 38.8 |
| PPG-26-Buteth-26 | 0.89 | 1.77 | 0.59 | 1.77 | 2.95 | 1.96 | 2.95 |
| PEG-40 Hydrogenated Castor Oil | 1.99 | 3.74 | 9.86 | 1.89 | 6.63 | 4.41 | 6.63 |
| Trideceth-9 | 1.39 | 2.54 | 0.46 | 0.69 | 4.63 | 3.08 | 4.63 |
| Potassium Sorbate | 0.1 | 0.1 | 0.1 | 0.1 | 0.1 | | |
| Bis-Peg-18 Methyl Ether Dimethyl Silane | | | | | | 1.5 | 1.5 |
| Phase B | | | | | | | |
| Dipropylene Glycol | 1 | 1 | 1 | 1 | 1 | 1 | 20 |
| Bis-PEG-12 Dimethicone | 3 | 3 | 3 | 3 | 3 | 0.5 | 0.5 |
| Hydroxy acetophenone | 0.3 | 0.3 | 0.3 | 0.3 | 0.3 | | |
| Pentylene Glycol | | | | | | 5 | 5 |
| Hexylene Glycol | | | 20.3 | | | 20 | |
| Glycerin | | | | | | 1 | 1 |
| Butylene Glycol | | | | | | 2 | 2 |
| Propanediol | | | | | | 4 | 4 |
| Phase C | | | | | | | |
| PEG-4 | 1 | 1 | | 1 | 1 | 1 | 1 |
| Glycereth-26 | 1 | 1 | | 1 | 1 | | |
| Fragrance Oil* | 2.5 | 5 | 7 | 2.5 | 2.5 | 15 | 10 |
| Phase D | | | | | | | |
| Caprylyl Glycol | 0.5 | 0.5 | 0.5 | 0.5 | 0.5 | 2 | 2 |

*Commercially available from IFF under the trade name "HAPPY DIFFERENT MOD 126"

The micro-content and standard challenges of all Formula 1-7 were passed after 8 weeks. All formulas stayed clear and stable. The preparation was found to be surprisingly silky and smooth after application. The representative skin feel attributes from expert panelist were listed in Table 2 below, in a 0-10 grading scale (with Smoothness, the higher the number is, the better the experience is; with Oiliness, the higher the number is, the worse the experience is; with Stickiness, the higher the number is, the worse the experience is):

TABLE 2

|  | Smoothness | | | Oiliness | | | Stickiness | | |
|---|---|---|---|---|---|---|---|---|---|
| Formulas | 1 | 4 | 5 | 1 | 4 | 5 | 1 | 4 | 5 |
| Initial | 8 | 5 | 6 | 5 | 6 | 6 | 5 | 6 | 6 |
| Rub-in | 8 | 6 | 5 | 4 | 5 | 7 | 6 | 5 | 7 |
| After-feel | 9 | 6 | 5 | 2 | 5 | 7 | 7 | 7 | 9 |

Therefore, the Formula 1 provided the best experience overall in terms of Smoothness, Oiliness, and Stickiness, while Formula 4 and Formula 5 also provided decent experience but not as good as what Formula 1 provided.

Example 2: Stability of the Formula 1

The Formula 1 composition was stored at 4° C., 25° C., and 40° C., respectively, for 8 weeks. It was observed that the composition stayed transparent and clear without any precipitation or cloudiness. Its viscosity and pH were also measured, as the results shown in the table below.

TABLE 3

| Stability of the Formula 1 at varied temperatures after eight weeks | | | |
|---|---|---|---|
|  | 4° C. | 25° C. | 40° C. |
| Transparency (Visual) | Clear | Clear | Clear |
| pH | Initial pH = 6.55 | Initial pH = 6.45 | Initial pH = 6.53 |
|  | pH (8 wks) = 6.51 | pH (8 wks) = 6.49 | pH (8 wks) = 6.56 |
| Viscosity (BrookFieldLVI) | <15 cPs | <15 cPs | <15 cPs |
| Appearances (Visual) | No color change | No color change | No color change |
| Odor evaluation after 8 weeks | Passed | Passed | Passed |

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the scope of the invention. It is therefore intended to cover in the appended claims all such changes and modifications that are within the scope of this invention.

What is claimed is:

1. A fragrance composition, comprising:
   at least one fragrance ingredient;
   a solubilizer comprising PPG-26-buteth-26, PEG-40 hydrogenated castor oil, and trideceth-9; and
   more than 40% water by weight, relative to a total weight of the fragrance composition,
   wherein the fragrance composition is substantially free of ethanol.

2. The fragrance composition of claim 1, comprising the PPG-26-buteth-26 and the PEG-40 hydrogenated castor oil at a ratio within a range of from about 10:1 to about 1:30 by weight.

3. The fragrance composition of claim 1, wherein the at least one fragrance ingredient comprises at least one fragrance oil.

4. The fragrance composition of claim 3, comprising the at least one fragrance oil in an amount within a range of from about 0.010% to about 40% by weight, relative to the total weight of the composition.

5. The fragrance composition of claim 3, wherein a c Log P value of the fragrance oil is less than 5.

6. The fragrance composition of claim 1, comprising the solubilizer in an amount of from about 0.001% to about 75% by weight, relative to the total weight of the fragrance composition.

7. The fragrance composition of claim 1, comprising the solubilizer and the at least one fragrance ingredient at a ratio within a range of from about 10:1 to about 1:10 by weight.

8. The fragrance composition of claim 1, wherein the fragrance composition has a viscosity of less than about 100 cps.

9. The fragrance composition of claim 1, wherein the fragrance composition is in a form of a perfume, perfume water, eau de toilette, eau de cologne, eau de parfum, fragrance mist, or air freshener.

10. The fragrance composition of claim 9, wherein the composition is a spray.

11. The composition of claim 1, further comprising at least one fragrance modulator.

12. The fragrance composition of claim 1 wherein the fragrance ingredient is selected from the group consisting of fragrance oils, esters, terpenes, aldehydes, ethers, lactones, amines, and mixtures thereof.

13. The fragrance composition of claim 1, wherein the fragrance composition comprises particles that impart a tactile sensory experience.

14. The fragrance composition of claim 1, wherein the fragrance composition is translucent or transparent at temperatures within a range of from about 3° C. to about 55° C.

15. The fragrance composition of claim 3, wherein the at least one fragrance oil is selected from the group consisting of essential oils, synthetic fragrances, and mixtures thereof.

16. The fragrance composition of claim 1, comprising the PPG-26-buteth-26 and the trideceth-9 at a ratio within a range of from about 30:1 to about 1:20 by weight.

17. The fragrance composition of claim 1, further comprising at least one silicone oil.

* * * * *